United States Patent
Lallier

(10) Patent No.: US 6,174,847 B1
(45) Date of Patent: Jan. 16, 2001

(54) COMPOSITION FOR STRIPPING PAINTS VARNISHES OR LACQUERS

(75) Inventor: Jean-Pierre Lallier, Arletty (FR)

(73) Assignee: Elf Atochem, S.A. (FR)

( * ) Notice: Under 35 U.S.C. 154(b), the term of this patent shall be extended for 0 days.

(21) Appl. No.: 08/987,138

(22) Filed: Dec. 8, 1997

(30) Foreign Application Priority Data

Dec. 6, 1996 (FR) .................................................. 96 15042
Feb. 27, 1997 (FR) .................................................. 97 02345

(51) Int. Cl.[7] ............................... C09D 9/00; C09D 9/02; C09D 9/04; B08B 7/00
(52) U.S. Cl. ........................ 510/203; 510/201; 510/206; 510/207; 510/212; 134/38
(58) Field of Search .................................... 510/201, 202, 510/203, 206, 207, 212; 134/38

(56) References Cited

U.S. PATENT DOCUMENTS

| | | | | |
|---|---|---|---|---|
| 4,120,810 | * | 10/1978 | Palmer | 252/153 |
| 4,617,251 | * | 10/1986 | Sizensky | 430/256 |
| 4,732,695 | | 3/1988 | Francisco | 252/162 |
| 4,764,222 | * | 8/1988 | Colgrove | 134/38 |
| 4,986,936 | * | 1/1991 | Wolbers | 252/170 |
| 5,011,621 | * | 4/1991 | Sullivan | 252/162 |
| 5,232,515 | | 8/1993 | Sullivan . | |
| 5,310,428 | * | 5/1994 | Bhatt et al. | 134/2 |
| 5,387,363 | * | 2/1995 | Distaso | 252/163 |
| 5,411,678 | | 5/1995 | Sim | 252/548 |
| 5,427,710 | * | 6/1995 | Stevens | 252/166 |
| 5,454,985 | * | 10/1995 | Harbin | 252/558 |
| 5,472,830 | * | 12/1995 | Honda | 430/331 |
| 5,518,661 | * | 5/1996 | Langford et al. | 252/364 |
| 5,575,859 | * | 11/1996 | Madsen et al. | 134/38 |
| 5,744,438 | * | 4/1998 | Distaso | 510/207 |
| 5,798,323 | * | 8/1998 | Honda et al. | 510/176 |

FOREIGN PATENT DOCUMENTS 648820    10/1994    (EP) .

OTHER PUBLICATIONS

Database WPI, Week 8948, AN 89–350370 (ES 2 008 593), Derwent Publications, Ltd., London GB.

* cited by examiner

Primary Examiner—Yogendra Gupta
Assistant Examiner—John M Petruncio
(74) Attorney, Agent, or Firm—Millen, White, Zelano & Branigan, P.C.

(57) ABSTRACT

This composition for stripping paints, lacquers or primers is characterized in that it consists of or comprises:

(A) 5 to 90 parts by weight of water;
(B) 2 to 47.5 parts by weight of benzyl alcohol;
(C) 2 to 47.5 parts by weight of dimethyl sulphoxide or N-methylpyrrolidone, (A)+(B)+(C) representing 100 parts by weight.

29 Claims, No Drawings

COMPOSITION FOR STRIPPING PAINTS VARNISHES OR LACQUERS

CROSS-REFERENCE TO RELATED APPLICATIONS

This application is related to the following concurrently filed applications: Attorney Docket No.: CHAIL 26, entitled "Aqueous Composition for Stripping Paints and Primers with a High Degree of Crosslinking" by Jean-Pierre Lallier, based on French Priority application 96/15041 filed Dec. 6, 1996; and, Attorney Docket No.: CHAIL 27, entitled "Composition for Stripping Paints, Varnishes or Lacquers" by Lallier, Marie, Aubry, Marti, and Del Nero, based on French Priority application 96/15040 filed Dec. 6, 1996, all of these applications being incorporated by reference herein.

FIELD OF THE INVENTION

The present invention relates to a composition for stripping paints, varnishes or lacquers coating a substrate, such as metals and wood.

BACKGROUND OF THE INVENTION

In the industrial stripping sector, shutters, windows, doors and radiators are stripped, as is any mechanical component (e.g.: wheel hubs, wheel rims, etc.). The industrial stripping of paints and the like is carried out by immersing the components to be stripped in a liquid bath formulated under hot or cold conditions, it being possible for this liquid bath to be stirred or not to be stirred. The components are left in the bath for a certain period until stripping is achieved (degradation or removal of the paint, depending on the systems). Next, the components are removed from the bath and are rinsed with a jet of pressurized water ("carcher"), the flakes or lumps of paint then being removed by the pressure of the water jet. When the bath contains a strong base of the NaOH type, a neutralization operation is carried out in an acid bath consisting of a solution of sulphur or hydrochloric acid.

The formulation currently used in industrial stripping are either chloride-based or alkali-based. Chloride baths or formulations are mixtures based on methylene chloride, methanol (5 to 10% by weight) and aromatics (toluene, xylene in a proportion of a few percent). The mixtures can also contain activators, which can be acidic (such as formic acid) or basic (such as monoethanolamine). Chloride baths are used cold since methylene chloride is very volatile and the odor it gives off is highly suffocating. The stripping action takes place by removal of the paint with formation of flakes. Industrial stripping technicians currently wish to replace chloride by a substitute for environmental reasons.

Alkaline baths or formulations are essentially based on sodium hydroxide in water to which are added sodium glycolate, complexing agents and wetting agents. The mixtures are used hot, at a temperature of about 50° C. to 100° C., and the stripping time is halved for every 20° C. rise in temperature.

The mechanism of action is totally different to that of the chloride formulations since these formulations degrade the paint by reaction of the sodium hydroxide with the polymer.

In particular, with glycerophthalic paints and alkyd paints, saponification of the ester functions takes place, which degrades the paint, reducing it to powder. When dispersed in the bath, this powder forms a sludge, which is a pet hate of stripping technicians. This sludge is virtually unfilterable (blocking). Moreover, alkaline formulations are less effective on other types of paint (epoxy, polyurethane, etc.). Industrial stripping technicians thus also wish to find a substitute formulation of greater versatility which does not lead to degradation of the paint.

SUMMARY OF THE INVENTION

Novel stripping formulations for paints, varnishes or lacquers, have been investigated so as to satisfy the current needs described above and constitute good-value formulations an advantageous replacement for the known chloride and alkaline formulations.

The novel stripping composition according to the present invention satisfies these aims; it is characterized in that it consists of or comprises:

(A) 5 to 90 parts by weight, preferably 10 to 80 parts by weight, of water;

(B) 2 to 47.5 parts by weight, preferably 5 to 45 parts by weight, of benzyl alcohol;

(C) 2 to 47.5 parts by weight, preferably 5 to 45 parts by weight, of dimethyl sulphoxide or of N-methylpyrrolidone, (A)+(B)+(C) representing 100 parts by weight.

The proportion of water, which can be large, makes this composition a very advantageous formulation in terms of costs.

The stripping composition according to the invention can also comprise:

(D) at least one activator, which may be chosen in particular from monoethanolamine (MEA), triethanolamine (TEA), formic acid, pyrrole, TEA/formic acid mixtures, benzaldehyde, MEA/benzaldehyde mixtures and alkali metal hydroxides such as sodium hydroxide (NaOH), in a proportion in particular of from 0.1 to 10 parts by weight per 100 parts by weight of (A)+(B)+(C).

The preferred activators are MEA/benzaldehyde mixtures (in particular 1 part by weight of MEA and 2 parts by weight of benzaldehyde), benzaldehyde and NaOH.

The stripping composition according to the invention can also additionally comprise:

(E) at least one surfactant, in a proportion in particular of from 0.1 to 10 parts by weight per 100 parts by weight of (A)+(B)+(C); as examples of nonionic surfactants, mention may be made of ethoxylated surfactants of the "Metox" series, sold by the company "SEPPIC" (for example the ethoxylated methyl ester fraction comprising 20 units of ethylene oxide "Metox 20 EO"); as examples of ionic surfactants, mention may be made of sodium dodecyl sulphate;

(F) at least one thickener chosen in particular from acrylic thickeners, in a proportion in particular of from 0.1 to 10 parts by weight per 100 parts by weight of (A)+(B)+(C); as specific examples of acrylic thickeners, mention may be made of the acrylic resins sold under the name "Carbopol" by the company Goodrich, BF, Co., whose production process is described in American patent U.S. Pat. No. 4,419,502 entitled "Polymerization process for carboxyl-containing polymers".

In accordance with a particularly advantageous embodiment of the present invention, the stripping composition comprises neither surfactant nor thickener, and in this case is in the form of an unstable emulsion.

In accordance with two other embodiments of the present invention, the stripping composition comprises at least one surfactant and no thickener, and in this case is in the form of a microemulsion, or it comprises at least one thickener and no surfactant and is in the form of a thickened emulsion.

The present invention also relates to a process for stripping paints, lacquers and varnishes applied to a substrate, using a stripping composition as defined above, characterized in that the said substrate is immersed in a bath which is optionally heated (for example to a temperature of between 40 and 70° C.) and the stripping composition is optionally stirred when it is in the abovementioned microemulsion or unstable emulsion forms, for a duration which is sufficient to bring about the removal of the paint, varnish or lacquer, or in that a stripping composition in the abovementioned thickened emulsion form is applied to the said substrate and is left to act for a duration which is sufficient to bring about the removal of the paint, varnish or lacquer.

The examples which follow illustrate the present invention without, however, limiting its scope. In these examples, the percentages of the compositions are given on a weight basis.

EXAMPLE 1

Unstable Emulsion

An unstable stripping emulsion was prepared, formulated as follows:

| | |
|---|---|
| Water | 78% |
| Benzyl alcohol | 11.6% |
| Dimethyl sulphoxide | 10.4% |
| | 100% |

By mixing these three ingredients together by bubbling, an unstable milky emulsion is formed which does not dephase completely for at least one hour.

A phosphate-treated steel substrate coated with a polyester lacquer (Glacier White 389 from Herberts), sold by the company Etalon, was immersed in a bath of this emulsion, brought to 50° C., with stirring.

The stripping took 20 minutes.

EXAMPLE 2

Microemulsion

A stripping microemulsion was prepared, formulated as follows:

| | |
|---|---|
| Water | 77.3% |
| Benzyl alcohol | 12% |
| Dimethyl sulphoxide | 10.7% |
| | 100% |
| Sodium dodecyl sulphate: | 3.1% |

Sodium dodecyl sulphate: 3.1%

By mixing these ingredients together, a totally transparent microemulsion which mixes with water is obtained, with only a very faint odour of solvents.

A stripping test was carried out under the same conditions as in Example 1, but without stirring the bath. The stripping took 38 minutes.

EXAMPLE 3

Thickened Emulsion

A thickened stripping emulsion was prepared, formulated as follows:

| | |
|---|---|
| Water | 78.1% |
| Benzyl alcohol | 11.5% |
| Dimethyl sulphoxide | 10.4% |
| | 100% |

Acrylic thickener sold under the name "Carbopol E22" by the company "Goodrich", 2.8%.

A mixture having the appearance of a totally homogeneous "thick milk" which does not demix even after several weeks is obtained.

A stripping test was carried out by applying this mixture to a phosphate-treated steel coated with a polyester lacquer (Glacier White 389 from Herberts), sold by the company Etalon, at room temperature (20° C.).

The stripping took 360 minutes.

EXAMPLES 4 TO 7

4 formulations of unstable emulsion type were prepared, as indicated in Table 1.

Stripping was carried out under the conditions of Example 1. The results are given in Table 1.

TABLE 1

| Composition | Example 4 | Example 5 | Example 6 | Example 7 |
|---|---|---|---|---|
| Water | 78.8% | 79.5% | 79.5% | 79.30% |
| Benzyl alcohol | 11.1% | 10.25% | 10.25% | 10.35% |
| Dimethyl sulphoxide | 10.1% | 10.25% | 10.25% | 10.35% |
| | 100% | 100% | 100% | 100% |
| Monoethanolamine | 1% | | 1% | 3.10% |
| Benzaldehyde | | 2.6% | 2% | |
| Stripping time (min) | 7 | 3.3 | 2 | 100 |

EXAMPLES 8 TO 12

The following base formulation for a micro-emulsion was prepared:

| | |
|---|---|
| Water | 78.1% |
| Benzyl alcohol | 11.5% |
| Dimethyl sulphoxide | 10.4% |
| | 100% |
| Sodium dodecyl sulphate: | 3.1% |

Five microemulsions were prepared by adding 1% of an activator as indicated in Table 2 below to the formulation and the stripping tests were carried out as in Example 2. The stripping results are also given in this table.

TABLE 2

| Example | 8 | 9 | 10 | 11 | 12 |
|---|---|---|---|---|---|
| Activator | Monoethanol-amine | TEA/formic acid | Pyrrole | Formic acid | Benzaldehyde |
| Stripping time (min) | 18 | 24 | 14 | 9.5 | 11 |

EXAMPLES 13 TO 16

The four thickened stripping emulsions as indicated in Table 3 were prepared. Stripping was carried out under the conditions of Example 3. The results are also given in Table 3.

TABLE 3

| Composition | Example 13 | Example 14 | Example 15 | Example 16 |
|---|---|---|---|---|
| Water | 78.1% | 78.3% | 78.1% | 78.2% |
| Benzyl alcohol | 11.5% | 11.4% | 11.5% | 11.4% |
| Dimethyl sulphoxide | 10.4% | 10.3% | 10.4% | 10.4% |
| | 100% | 100% | 100% | 100% |
| "Carbopol E22" thickener | 2.4% | 5.5% | 4.2% | 3.7% |
| Pyrrole | 1% | | | |
| Formic acid | | 1% | 5.25% | |
| TEA/formic acid | | | | 4.2% |
| Stripping time (min) | 240 | 210 | 70 | 1.0 |

EXAMPLE 17

Unstable Emulsion

An unstable stripping emulsion was prepared, formulated as follows:

| | |
|---|---|
| Water | 78% |
| Benzyl alcohol | 11% |
| N-methylpyrrolidone | 11% |
| | 100% |

The process was performed as in Example 1. The stripping took 19 minutes 30 seconds.

EXAMPLE 18

A formulation of the unstable emulsion type was prepared, having the composition as indicated below:

| | |
|---|---|
| Water | 78.30% |
| Benzyl alcohol | 10.85% |
| Dimethyl sulphoxide | 10.85% |
| | 100% |
| Sodium hydroxide | 8.7% |

A plate made of XC45 phosphate-treated steel coated with an epoxy powder was immersed in a bath of this emulsion, brought to 50° C., with stirring.

The stripping took 10 minutes.

The preceding examples can be repeated with similar success by substituting the generically or specifically described reactants and/or operating conditions of this invention for those used in the preceding examples.

The entire disclosure of all applications, patents and publications, cited above and below, and of corresponding French applications 96/15042 and 97/02345, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

I claim:

1. A composition for stripping paints, lacquers or primers, comprising:
    (A) 5 to 90 parts by weight of water;
    (B) 2 to 47.5 parts by weight of benzyl alcohol;
    (C) 2 to 47.5 parts by weight of dimethylsulfoxide,
    (A)+(B)+(C) representing 100 parts by weight.
2. A composition according to claim 1, comprising:
    (A) 10 to 80 parts by weight of water;
    (B) 5 to 45 parts by weight of benzyl alcohol;
    (C) 5 to 45 parts by weight of dimethyl sulphoxide.
3. A composition according to claim 1, further comprising:
    (D) 0.1 to 10 parts by weight, per 100 parts by weight of (A)+(B)+(C), of at least one activator selected from the group consisting of monoethanolamine, triethanolamine, formic acid, pyrrole, a TEA/formic acid mixture, benzaldehyde, a MEA/benzaldehyde mixture or an alkali metal hydroxide.
4. A composition according to claim 2, further comprising:
    (D) 0.1 to 10 parts by weight, per 100 parts by weight of (A)+(B)+(C), of at least one activator selected from the group consisting of monoethanolamine, triethanolamine, formic acid, pyrrole, a TEA/formic acid mixture, benzaldehyde, a MEA/benzaldehyde mixture or an alkali metal hydroxide.
5. A composition according to claim 3, wherein the activator is a monoethanolamine/benzaldehyde mixture, benzaldehyde or sodium hydroxide.
6. A composition according to claim 4, wherein the activator is a monoethanolamine/benzaldehyde mixture, benzaldehyde or sodium hydroxide.
7. A process for stripping a paint, a varnish or a lacquer from a substrate, in a bath, which is optionally heated and optionally stirred, said bath containing a composition as defined in claim 1, comprising immersing said substrate in said bath, for a duration sufficient to bring about the removal of the paint.
8. A composition for stripping paints, lacquers or primers, comprising
    (A) 5 to 90 parts by weight of water;
    (B) 2 to 47.5 parts by weight of benzyl alcohol;
    (C) 2 to 47.5 parts by weight of dimethylsulfoxide,
    (A)+(B)+(C) representing 100 parts by weight, said composition comprising neither surfactant nor thickener, and being in the form of an unstable emulsion.
9. A composition according to claim 8, comprising:
    (A) 10 to 80 parts by weight of water;
    (B) 5 to 45 parts by weight of benzyl alcohol;
    (C) 5 to 45 parts by weight of dimethyl sulphoxide.

10. A composition according to claim 8 further comprising:
(D) 0.1 to 10 parts by weight, per 100 parts by weight of (A)+(B)+(C), of at least one activator selected from the group consisting of monoethanolamine, triethanolamine, formic acid, pyrrole, a TEA/formic acid mixture, benzaldehyde, a MEA/benzaldehyde mixture or an alkali metal hydroxide.

11. A composition according to claim 1 further comprising:
(D) 0.1 to 10 parts by weight, per 100 parts by weight of (A)+(B)+(C), of at least one activator selected from the group consisting of monoethanolamine, triethanolamine, formic acid, pyrrole, a TEA/formic acid mixture, benzaldehyde, a MEA/benzaldehyde mixture or an alkali metal hydroxide.

12. A composition according to claim 10, wherein the activator is a monoethanolamine/benzaldehyde mixture, benzaldehyde or sodium hydroxide.

13. A composition according to claim 11, wherein the activator is a monoethanolamine/benzaldehyde mixture, benzaldehyde or sodium hydroxide.

14. A process for stripping a paint, a varnish or a lacquer from a substrate, in a bath, which is optionally heated and optionally stirred, said bath containing a composition as defined in claim 8, comprising immersing said substrate in said bath, for a duration sufficient to bring about the removal of the paint.

15. A process for stripping a paint, a varnish or a lacquer from a substrate, in a bath, which is optionally heated and optionally stirred, said bath containing a composition as defined in claim 10, comprising immersing said substrate in said bath, for a duration sufficient to bring about the removal of the paint.

16. A composition for stripping paints, lacquers or primers, comprising:
(A) 5 to 90 parts by weight of water,
(B) 2 to 47.5 parts by weight of benzyl alcohol;
(C) 2 to 47.5 parts by weight of dimethyl sulfoxide;
(A)+(B)+(C) representing 100 parts by weight,
said composition comprising at least one acrylic thickener in a proportion from 0.1 to 10 part by weight per 100 parts by weight of (A)+(B)+(C), and being in the form of a thickened emulsion.

17. A composition according to claim 16, further comprising 0.1 to 10 parts by weight, per 100 parts by weight of (A)+(B)+(C), of at least one activator selected from among monoethanolamine, triethanolamine, formic acid, pyrrole, a TEA/formic acid mixture, benzaldehyde, a MEA/benzaldehyde mixture or an alkali metal hydroxide.

18. A process for stripping a paint, a varnish or a lacquer from a substrate, in a bath, which is optionally heated and optionally stirred, said bath containing a composition as defined in claim 16, comprising immersing said substrate in said bath, for a duration sufficient to bring about the removal of the paint.

19. A composition according to claim 16, comprising:
(A) 10 to 80 parts by weight of water;
(B) 5 to 45 parts by weight of benzyl alcohol;
(C) 5 to 45 parts by weight of dimethyl sulphoxide.

20. A composition according to claim 17, comprising:
(A) 10 to 80 parts by weight of water;
(B) 5 to 45 parts by weight of benzyl alcohol;
(C) 5 to 45 parts by weight of dimethyl sulphoxide.

21. A composition according to claim 16, wherein the composition does not comprise a surfactant.

22. A process for stripping a paint, a varnish or a lacquer from a substrate, in a bath, which is optionally heated and optionally stirred, said bath containing a composition as defined in claim 17, comprising immersing said substrate in said bath, for a duration sufficient to bring about the removal of the paint.

23. A composition for stripping paints, lacquers or primers, comprising:
(A) 5 to 90 parts by weight of water;
(B) 2 to 47.5 parts by weight of benzyl alcohol;
(C) 2 to 47.5 parts by weight of dimethyl sulfoxide;
(A)+(B)+(C) representing 100 parts by weight, said composition at least one surfactant selected among ethoxylated non-ionic surfactants and sodium dodecyl sulphate in a proportion from 0.1 to 10 parts by weight per 100 parts by weight of (A)+(B)+(C), and being in the form of a microemulsion.

24. A composition according to claim 23, further comprising 0.1 to 10 parts by weight, per 100 parts by weight of (A)+(B)+(C), of at least one activator selected among monoethanolamine, triethanolamine, formic acid, pyrrole, a TEA/formic acid mixture, benzaldehyde, a MEA/benzaldehyde mixture or an alkali metal hydroxide.

25. A process for stripping a paint, a varnish or a lacquer from a substrate, in a bath, which is optionally heated and optionally stirred, said bath containing a composition as defined in claim 23, comprising immersing said substrate in said bath, for a duration sufficient to bring about the removal of the paint.

26. A composition according to claim 23, comprising:
(A) 10 to 80 parts by weight of water;
(B) 5 to 45 parts by weight of benzyl alcohol;
(C) 5 to 45 parts by weight of dimethyl sulphoxide.

27. A composition according to claim 23, wherein the composition does not comprise a thickener.

28. A composition according to claim 24, comprising:
(A) 10 to 80 parts by weight of water;
(B) 5 to 45 parts by weight of benzyl alcohol;
(C) 5 to 45 parts by weight of dimethylsulfoxide.

29. A process for stripping a paint, a varnish or a lacquer from a substrate, in a bath, which is optionally heated and optionally stirred, said bath containing a composition as defined in claim 24, comprising immersing said substrate in said bath, for a duration sufficient to bring about the removal of the paint.

* * * * *